United States Patent
Sabo

Patent Number: 5,127,049
Date of Patent: Jun. 30, 1992

[54] CODED PHONE SECURITY SYSTEM

[76] Inventor: Martin Sabo, 2407 Poinsetta Dr., McKeesport, Pa. 15131

[21] Appl. No.: 507,451

[22] Filed: Apr. 11, 1990

[51] Int. Cl.⁵ .............................................. H04M 1/66
[52] U.S. Cl. .................................... 379/199; 379/188; 379/375
[58] Field of Search ............... 379/199, 200, 188, 201, 379/67, 95, 375, 373

[56] References Cited

U.S. PATENT DOCUMENTS

| | | | |
|---|---|---|---|
| 4,117,272 | 9/1978 | Ando | 379/373 |
| 4,277,649 | 7/1981 | Sheinbein | 379/201 |
| 4,369,339 | 1/1983 | Castro et al. | 379/177 |
| 4,430,728 | 7/1984 | Beitel et al. | 364/900 |
| 4,520,233 | 5/1985 | Smith | 379/95 |
| 4,611,098 | 9/1986 | Giorgio et al. | 179/84 |
| 4,626,623 | 12/1986 | LaHaye | 379/95 |
| 4,679,226 | 6/1986 | Muehleisen | 379/95 |
| 4,707,804 | 11/1987 | Leal | 340/825 |
| 4,845,743 | 7/1989 | Lutz | 379/199 |
| 4,850,013 | 7/1989 | Rose | 379/199 |

*Primary Examiner*—James L. Dwyer
*Assistant Examiner*—Ahmad F. Matar
*Attorney, Agent, or Firm*—Eugene E. Renz, Jr.

[57] ABSTRACT

A telephone security device is placed in the telephone line between the primary transmission network and receiver. Incoming telephone calls are automatically answered and monitored for a predetermined time. When a proper code is supplied by the calling party during the monitored time interval, an audio alert is sounded so the called party may pick up the phone and responsd in a normal manner. If the phone is not picked up during the time interval, the call is terminated.

18 Claims, 3 Drawing Sheets

CODED PHONE SECURITY SYSTEM

THE INVENTION

This invention relates to a means to monitor incoming telephone calls, answer the incoming calls and pass the incoming calls onto a handset provided the incoming calls are properly identified by a code means.

BACKGROUND OF THE INVENTION

The telephone is a boon to mankind. It provides communications over short or long distances to call emergency assistance, conduct business negotiations or simply to pass the time of day between friends. Without this aid, civilization as we know it would not be possible. However, with the advent of more sophisticated telephone systems such as automatic dialing and computer operated voice and response systems, unscrupulous entrepreneurs have turned the telephone from a friendly device into a demon capable of harassing anyone with a telephone with unsolicited sales promotions, messages and the like.

When a salesman rings your door bell you don't have to answer. But with a telephone, when it rings you have to pick it up to find out who is there. If it's an unsolicited call relating to a sales promotion or other form of harassment, many times the answering party is trapped into listening to the message. This practice of unsolicited telephone calls for sales and advertising purposes has become such an annoying burden that many people have installed telephone answering machines which require a calling party to leave a message. Then the person using the answering machine plays back a tape or listens to the incoming message in real time and makes a decision to answer the call or return the call. This is costly and time consuming and the individual is still bothered by the unsolicited calls because a certain amount of time has to be devoted to listen to the message to identify just what type of call it is.

Numerous attempts have been made to provide a security device which is inexpensive and convenient for the user but these devices have numerous shortcomings. For instance, J. Smith in U.S. Pat. No. 4,520,233 on "Telephone Line Security Apparatus" issued May 28, 1985 discloses a device which is placed at a subscriber's station to intercept incoming calls. The intercepted calls are monitored for a coded message and if a proper code is transmitted, the line is terminated and an automatic call back is made to the calling number associated with the code to provide added security. This system is extremely elaborate and requires added expense for the user, especially if long distance telephone calls are involved because the calling party merely has to initiate the call and then the receiving party has to pay the greater charges for initiating a second call plus the time charges during the course of the following conversation.

M. Castro et al, U.S. Pat. No. 4,369,339 on "Method For Completing The Connection Between A Telephone Exchange And The Phone Subscriber's Line In Response To The Reception, At The Exchange, Of A Pre-Established Code" issued Jan. 19, 1983 describes a system which requires the calling station to transmit a proper code before the call is completed to the subscriber's handset. In this system the decoding operation occurs at the last distribution point of the network prior to the subscriber's line. Therefor, the subscriber has no control over the system and in reality it is a piece of network equipment.

P. Giorgio et al, U.S. Pat. No. 4,611,098 on "Coded Telephone Access System" issued Sep. 9, 1986 discloses a subcriber station security device which automatically answers a telephone call, checks the incoming call for a proper coded signal and if the coded signal is received, it completes the call. If a coded signal is not received within a predetermined time period, the call is automatically terminated. In this system an overly complex and expensive circuit design is utilized. This complex system has resulted in a product which is costly to manufacture and maintain and not user friendly. It uses excessive current, will not go to an "on-hook" condition after a predetermined, will not wait a predetermined number of rings before going into the answer mode, and will not automatically reset when the phone line transitions from "off-hook" to "on-hook". Therefor, it has not met with economical success even in view of the grave need for such an apparatus.

OBJECTIVES OF THE INVENTION

It is a primary purpose of the present invention to provide a system which will eliminate the possibility of unsolicited calls ringing a user's handset.

Another objective of the present invention is to provide a means to intercept incoming calls and allow only those calls having a proper identifying code or message appended thereto to cause activation of an alert signal announcing an incoming call.

Another objective of the present invention is to provide a means where individuals may selectively establish a security system which will prevent incoming calls unless a proper identification code is presented following the normal ring.

It is a still further objective of the present invention to provide a lockout system which prevents a handset from ringing if a calling party fails to provide a proper identification code.

Another objective of the invention is to provide a telephone security intercept system requiring a separate code to cause an incoming call alert which will automatically go to an "on-hook" condition if the receiver is not picked up within a predetermined time period.

A still further objective of the present invention is to provide an electronic circuit for answering incoming calls and monitoring the call line for a predetermined time period to ascertain whether or not a coded message is presented.

Another objective of the invention is to provide a telephone security intercept system requiring decoding of a special access code in which the system is automatically reset when the associated receiver transitions to an "on-hook" status.

A still further objective of the present invention is to provide a means to monitor an incoming telephone line and pass the call to a receiver handset only when a proper identification code is supplied within a predetermined time period after the initial ring signal from the network.

Another objective of the invention is to provide a security intercept system which places the associated receiver in an "off-hook" condition after a predetermined number of received ring signals.

It is a further objective of the present invention to provide a coded phone security system of the type typified in the preceding paragraphs which is small and compact enough to allow a person to transport the device in a pocket or purse and place it in line at any selected telephone handset.

The foregoing and other objectives of the invention will become apparent in light of the drawings, specification and claims contained herein.

SUMMARY OF THE INVENTION

This invention is a telephone security device fabricated using CMOS technology to ensure a small compact reliable device which may be placed in a telephone line between the receiver and the incoming phone jack at the base of the receiver. It includes circuitry responsive to the ring signal to place the tip line in an "off-hook" condition and monitor for incoming messages for a predetermined period of time. If an incoming message is received within the monitoring window, the message is decoded and if a proper code is detected, a sounder is activated and the incoming line held open. The sounder is activated to emulate an incoming ring signal and when the user places the telephone receiver in an "off-hook" condition, the signals to the sounder are terminated and the incoming call line is switched to the handset. When the handset is placed on the hook after termination of the call, the coded phone security system is reset to monitor the line for the next incoming call.

DESCRIPTION OF THE INVENTION

Figure 1:
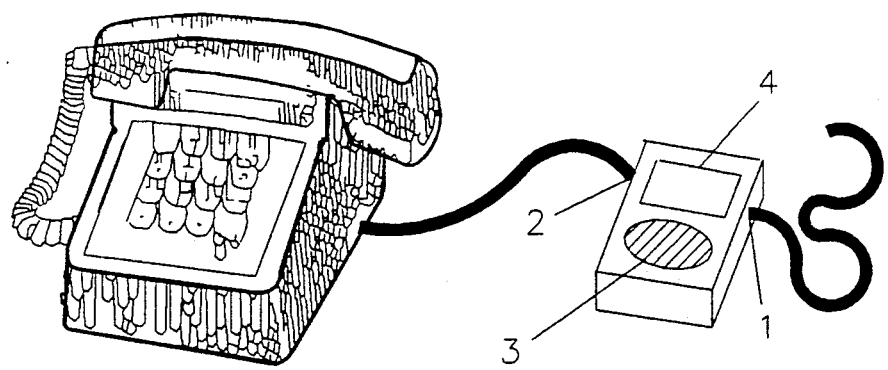
FIG. 1 is an illustration of a typical configuration for the coded phone security system.

This invention, a coded telephone security device, was designed to function within the guidelines established by the F.C.C. and all other known required telephone regulations. It uses integrated CMOS circuitry which results in a compact assembly that may be carried in a pocket, purse or briefcase and installed temporarily at the input to an office or hotel telephone or permanently on any selected telephone line as illustrated in FIG. 1.

The assembly includes a jack 1 which receives the telephone cable normally connected to the telephone handset and a jack 2 which is connected to the telephone handset via a short jumper cable to replace the normal handset input. Integrated circuitry which decodes incoming data and accomplishes the following operational step is included in the box:

(1) Intercepting and integrating incoming ring pulses on the telephone line;

(2) Generating an enabling pulse in response to a predetermined value of the integrated incoming ring pulses;

(3) Generating a timing pulse in response to the enabling pulse;

(4) Answering the incoming telephone call by placing an "off-hook" emulating impedance across the telephone line for the duration of the timing pulse;

(5) Establishing an isolated interconnection between the telephone line and a decoder for the duration of the timing pulse;

(6) Decoding incoming data on the telephone line for the duration of the timing pulse;

(7) Establishing an alternate means for holding the telephone line in an "off-hook" condition irrespective of the presence or absence of the timing pulse; and (8) Simultaneously turning off the alternate means for holding the telephone line in an "off-hook" condition, breaking the isolated interconnection to the telephone line, removing the "off-hook" emulation and resetting the decoder circuits.

A sounder 3 provides an audio signal indicating a properly decoded incoming call and an access door 4 allows the code setting jumpers or switches to be changed.

Figure 2:
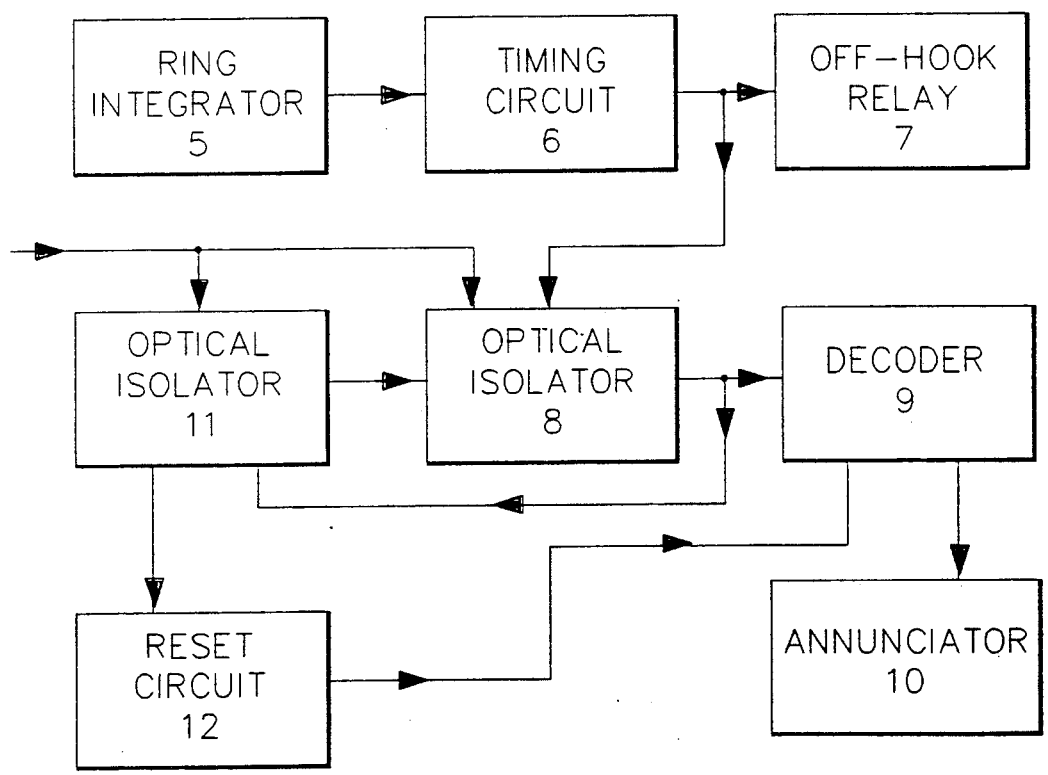
FIG. 2 is a block diagram depicting the major functions of the coded phone security system.

The main electronic building blocks which comprised the coded telephone system are illustrated in FIG. 2. A ringing integrator 5 monitors the ring line and upon sensing a predetermined of number of ring signals within a preset time interval, it produces a pulsed output that triggers a monostable multivibrator 6. The monostable multivibrator creates a timing interval during which the "off-hook" relay 7 is energized to provide a 200 ohm loading to the telephone line so that the network assumes the phone is "off-hook". This same output of the monostable multivibrator activates optical isolator 8 which couples voice data or tones from the telephone line to a decoder 9. The decoder includes a DTMF circuit which functions in combination with a pulse decoder to provide an output in response to a proper code sequence that causes the annunciator 10 to alert a user that an incoming telephone call has been detected and answered and that incoming telephone call has further been identified as being placed by someone who knows the security code.

In addition to channeling incoming audio signals to the decoder 9, the optical isolator 8 provides an enabling signal to the second optical isolator 11. This optical isolator is coupled to the telephone line and monitors the state of the line. When it senses the line going from an "on-hook" to an "off-hook" condition, it causes reset circuit 12 to reset the whole system and place it in a standby mode ready to receive the next incoming telephone call.

If the telephone handset is picked up either in response to the annunciator 10 or because the user desired to pick it up and answer the phone even though a proper code had not been detected, the telephone network will continue to sense an "off-hook" condition. When the monostable multivibrator 6 times out and the "off-hook" relay and optical isolator are disabled, the receiver handset will remain in an "off-hook" condition until the user hangs the phone up. At such time, the reset circuit comprised of optical isolator 11 and reset circuit 12 will reset the system.

If no one picks up the handset before the monostable multivibrator 6 times out, the "off-hook" relay is deenergized along with the means for activating at the optical isolator 8. However, the optical isolator 8 is also energized by a self-holding feature accomplished through optical isolator 11 so that both optical isolator 8 and 11 remain in the circuit to cause a reset when the telephone line goes from an "off-hook" to an "on-hook" condition. Therefor, if the monostable multi-vibrator times out and goes to an "off-hook" condition but the handset had been picked up prior to the multivibrator timing out, the "off-hook" condition will remain on the line due to the loading created by the handset being "off-hook". Thus the user may use the phone in a normal fashion and the system will not interfere. However, when the user hangs up the handset, the change in the line from "off-hook" to "on-hook" as sensed by the optical isolators 8 and 11, will cause the reset circuit 12 to reset the system and place it in a standby mode ready to receive the next incoming call.

Figure 3:
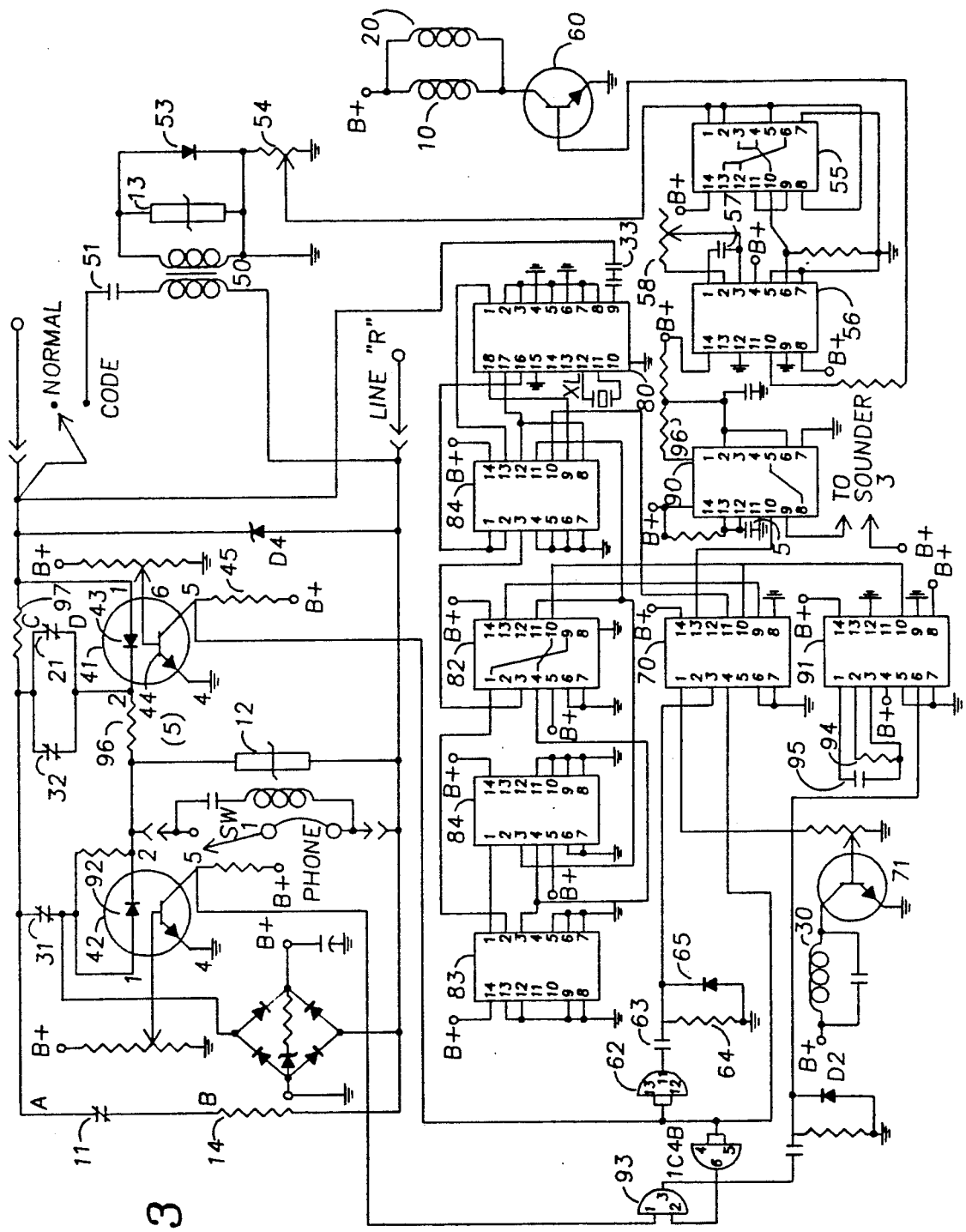
FIG. 3 is a schematic diagram of a battery powered coded phone security system.

A combination of relay contacts 11, 21, 31 and 32 and optical isolators 41 and 42 isolate the electronic circuitry from the phone lines, see FIG. 3. Thus their is no significant drain on the telephone lines when the phone is "off-hook" due to the CMOS circuitry employed in the coded phone. Metal Oxide Friskers 12 and 13 are used to suppress telephone line surges.

The circuit illustrated in FIG. 3 is designed around CMOS devices which are powered by a 4.5 to 6 volt DC supply. Because of the low drain of CMOS devices, batteries may be used to supply the necessary DC voltages. This eliminates the need for cumbersome AC-to-DC rectifiers, transformers, and other supply devices such as the subcircuit 100 illustrated in FIG. 4.

The coded phone is activated by an incoming call when the ring voltage from the telephone line is applied to transformer 50 via capacitor 51. This series capacitor/transformer integrating network determines the number of rings that will occur before the coded phone is placed "off-hook". The output of the transformer is rectified by diode 53 which causes a DC voltage to be developed across resistor 54. This voltage is applied to pulse shaper 55 which is created by the interconnection of the three 3-input NAND gates of a CD4023 integrated circuit. The output at pin 9 is applied to pin 6 of timing circuit 56 which is a CD 4047 monostable multivibrator which generates a timing interval that is set by capacitor 57 and potentiometer 58. The time set by 57 and 58 determines how long the phone will remain "off-hook" for accepting the digit code.

The "off-hook" condition is accomplished by applying the output from pin 10 of the timing circuit 56 to the base of transistor 60 via resistor 61. This causes the transistor to conduct and energizes relays 10 and 20. With relay 10 energized, the normally open contacts 11 close and applies a 200 ohm load 14 to the line.

The normally open contact 21 close and applies a voltage to the light emitting diode 43 of optical isolator 41 which causes the transistor 44 to conduct through resistor 45. The output of transistor 44 is applied to AND gate 62. The output of 62 is then shaped by capacitor 63, resistor 64, and diode 65. This voltage is then applied to pin 3 of the CD4013 dual D flip-flop 70 which causes its pin 1 to go high. The output from pin 1 turns on transistor 71, which in turn energizes relay 30. The three sets of normally open contacts 31, 32 and 33 close and are used for: (1) sealing in optical isolator 41; (2) energizing optical isolator 42; and (3) closing the input to pin 9 of tone decoder 80 for assimilating the correct input code.

The decoding by the tone decoder 80 is accomplished by applying the binary outputs from pins 1, 16, 17, and 18 to pins 13, 1 and 2, 8 and 12, and 9 respectively. The AND circuitry of the CD4081 integrated circuits 81 and 83 is then used in conjunction with the flip-flops of the CD4013 integrated circuits 82 and 84 to produce the necessary decoding which was first initiated by tone decoder 80. It is also significant to note that the code can be changed to any combination by changing the sequence at pins 1, 16, 17 and 18 of tone decoder 80.

If the correct code is sent by the caller, the decoder comprised of integrated circuits 80, 81, 82, 83 and 84 will recognize the fact and cause pins 13 of 70 to go high and trigger pin 10 of the astable multivibrator 90 which is a 556 timer. The oscillator will drive the speaker which will sound the alert that a phone call has been made and that it is someone who has permission to call by dialing the correct code number.

During this time, the monostable multivibrator CD4047 integrated circuit 91 is timing and if no one answers the coded phone, it will time out via resistor 61 and transistor 60 and cause the phone to go "on-hook".

If the coded phone is answered before the multivibrator 56 times out, SW1 (internal to the phone) will close and stop the ringing due to additional current flowing into optical isolators 41 and 42 and the resultant change in the output of gate 62. The current takes two paths, one through resistor 96 and diode 43 to line G along with the parallel path through contacts 32 and then to resistor 97. The second path is through diode 92 of optical isolator 42 to line G via contacts 31.

When the coded phone is "off-hook", the increased current through diode 92 will also cause pins 1 and 2 of AND gate 93 to go low and pin 3 to go high and trigger pin 6 of multivibrator 91. This will reset 70 and 82 via pin 10 of 91 to pin 10 of 70 and 82.

Resistor 94 and capacitor 95 of multivibrator 91 sets the 30 reset time during the loading period when 200 ohms R10 are across the telephone line G and R and also when the phone is "off-hook" for use and when the phone is hung-up, "on-hook".

The phone can be used normally when making a call. This is accomplished when the phase is "off-hook" and the internal switch causes current to flow through resistor 96 and diode 43 to line G. This will, as previously explained, cause relay 30 to energize and its three sets of contacts 31, 32 and 33 to close. Audible voice current will then flow through contacts 31 of optical isolator 42. When the phone is hung-up, the circuitry is automatically reset.

Figure 4:
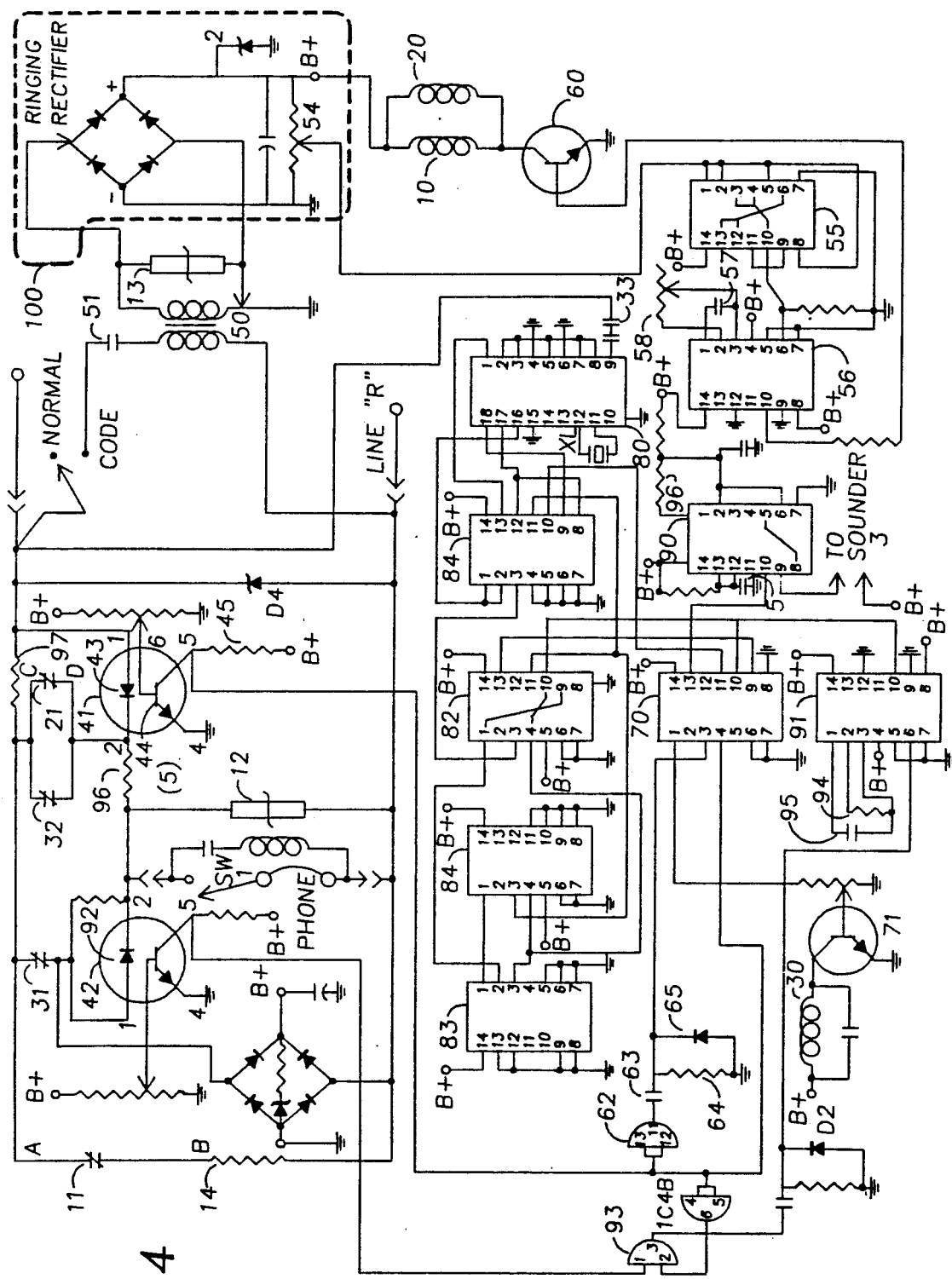
FIG. 4 is a schematic diagram of a coded phone security system powered by the telephone line current.

The schematic illustrated in FIG. 4 functions exactly as described above with respect to FIG. 3 except ringing current rectifier 100 replaces the battery power supply.

This invention shows only the touch-tone method of making a coded phone. However, the dial or digit type phone can be easily included in the circuitry by adding a few additional parts.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A coded phone security system comprising:
 a ring integrator;
 means for creating an enabling timing pulse in response to an output from said ring integrator;
 means for placing an "off-hook" equivalent impedance on a telephone line during the duration of said timing pulse;
 a first optical isolator coupled to the telephone line via a normally open relay contact controlled by a relay coil responsive to said timing pulse;
 means for connecting said first optical isolator to a telephone line during the duration of said timing pulse;
 a second optical isolator for providing an enabling connection between said first optical isolator and said telephone line irrespective of the presence of said timing pulse;

decoder means responsive to said telephone line through said first optical isolator;

an annunciation means responsive to an output from said decoder indicative of the detection of a properly configured code; and reset means responsive to said telephone line via said second optical isolator for resetting said coded phone security system when said telephone line transitions from an "off-hook" condition to an "on-hook" condition.

2. An apparatus as defined in claim 1 wherein said ring integrator comprises a series LC circuit including the primary winding of a transformer and a capacitor, and a pulse shaping integrated circuit responsive to said LC circuit reaching a predetermined voltage value.

3. An apparatus as defined in claim 1 wherein said means for creating an enabling timing pulse comprises a monostable multivibrator responsive to a pulse provided by said ring integrator.

4. An apparatus as defined in claim 1 wherein said "off-hook" equivalent impedance comprises a 200 ohm resistor connected across the telephone network line by a normally open relay contact.

5. An apparatus as defined in claim 1 wherein said decoder comprises a dual tone multifrequency detector and a plurality of flip-flops arranged to perform a decoding/counting function in response to the output of said dual tone multifrequency detector.

6. An apparatus as defined in claim 1 wherein said annunciator includes an integrated timing circuit interconnected to function as an audio frequency oscillator and a transducer responsive to the audio frequency produced by said timing circuit.

7. A coded phone security system comprising:

a ring integrator;

means for creating an enabling timing pulse in response to an output form said ring integrator;

means for placing an "off-hook" equivalent impedance on a telephone line during the duration of said timing pulse;

a first optical isolator including a diode; means for connecting said first optical isolator to a telephone line during the duration of said timing pulse;

a second optical isolator for providing an enabling connection between said first optical isolator and said telephone line irrespective of the presence of said timing pulse, said second optical isolator coupled to said telephone line via a normally open relay contact closed by energization of a relay coil responsive to current flow through said diode of said first optical isolator;

decoder means responsive to said telephone line through said first optical isolator;

an annunciation means responsive to an output from said decoder indicative of the detection of a properly configured code; and reset means responsive to said telephone line via said second optical isolator for resetting said coded phone security system when said telephone line transitions from an "off-hook" condition to an "on-hook" condition.

8. An apparatus as defined in claim 1 wherein said reset circuit comprises means for resetting said decoder circuit and deenergizing all of said relays in response to a reduction in the impedance of said telephone line indicative of said telephone line going from an "off-hook" to an "on-hook" condition.

9. A coded phone security system comprising:

an integrator for telephone ring pulses;

a timing circuit activated by an output from said integrator;

means for placing a resistance across the telephone line for a time duration controlled by said timing circuit;

a first switching circuit;

means for connecting said first switching circuit to a telephone line for a time duration controlled by said timing circuit;

a second switching circuit for providing a connection between said first switching circuit and said telephone line irrespective of said timing circuit; decoder means responsive to said telephone line through said first switching circuit;

an audio signal generator activated by said decoder upon the detection of a properly configured code; and reset means responsive to said telephone line via said second switching circuit for resetting said coded phone security system when said telephone line transitions from an "off-hook" condition to an "on-hook" condition.

10. An apparatus as defined in claim 9 wherein said integrator comprises a series LC circuit including the primary winding of a transformer and a capacitor, and a pulse shaping integrated circuit responsive to said LC circuit reaching a predetermined voltage value.

11. An apparatus as defined in claim 9 wherein said timing circuit comprises a monostable multivibrator responsive to a pulse provided by said integrator.

12. An apparatus as defined in claim 9 wherein said resistance comprises a 200 ohm resistor connected across the telephone line by said means for connecting said first switching circuit to a telephone line.

13. An apparatus as defined in claim 9 wherein said first switching circuit includes a normally open relay contact controlled by a relay coil responsive to said timing circuit coupled to the telephone line.

14. An apparatus as defined in claim 9 wherein said decoder comprises a dual tone multifrequencey detector and a plurality of flip-flops arranged to perform a decoding/counting function in response to the output of said dual tone multifrequency detector.

15. An apparatus as defined in claim 9 wherein said audio signal generator includes an integrated timing circuit interconnected to function as an audio frequency oscillator and a transducer responsive to the audio frequency produced by said timing circuit.

16. An apparatus as defined in claim 9 wherein said switching circuit includes a normally open relay contact closed by energization of a relay coil responsive to current flow through the diode of said first optical isolator coupled to said telephone line.

17. An apparatus as defined in claim 9 wherein said reset circuit comprises means for resetting said decoder circuit and deenergizing all of said relays in response to a reduction in the impedance of said telephone line indicative of said telephone line going from an "off-hook" to an "on-hook" condition.

18. A method for providing a coded security access system to a telephone handset, including the steps of:

intercepting and integrating incoming ring pulses on the telephone line;

generating an enabling pulse in response to a predetermined value of the integrated incoming ring pulses;

generating a timing pulse in response to the enabling pulse;

answering the incoming telephone call by placing an "off-hook" emulating impedance across the telephone line for the duration of the timing pulse;

establishing an isolated interconnection between the telephone line and a decoder for the duration of the timing pulse by energizing a relay via said timing pulse to close a set of normally open relay contacts and thereby connect an optical isolator between said telephone line and said decoder;

decoding incoming data on the telephone line for the duration of the timing pulse;

establishing an alternate means for holding the telephone line in an "off-hook" condition irrespective of the presence or absence of the timing pulse; and simultaneously turning off the alternate means for holding the telephone line in an "off-hook" condition, breaking the isolated interconnection to the telephone line, removing the "off-hook" emulation and resetting the decoder circuits.

* * * * *